United States Patent [19]

Nelson et al.

[11] 3,869,103

[45] Mar. 4, 1975

[54] RETRACTION SYSTEM FOR DOUBLE POD AIR CUSHION LANDING GEAR SYSTEM

[75] Inventors: Bud D. Nelson, Kent; William M. Brennan, Edmonds, both of Wash.

[73] Assignee: The United States of America as represented by the Secretary of the Navy, Washington, D.C.

[22] Filed: Oct. 12, 1973

[21] Appl. No.: 406,064

[52] U.S. Cl. ............................ 244/100 R, 180/124
[51] Int. Cl. ............................................. B60v 3/08
[58] Field of Search ............ 244/100 R, 100 A, 105; 180/124, 127, 123, 121, 122

[56] References Cited
UNITED STATES PATENTS 3,004,737  10/1961  Boyle et al. ..................... 244/105 X
3,165,280  1/1965  Shad-Tang Lee ............... 244/105 X
3,288,235  11/1966  Jones ................................. 180/122
3,524,517  8/1970  La Fleur ............................. 180/124

FOREIGN PATENTS OR APPLICATIONS 859,373  12/1940  France .............................. 244/105

Primary Examiner—Trygve M. Blix
Assistant Examiner—Paul E. Sauberer
Attorney, Agent, or Firm—R. S. Sciascia; Henry Hansen

[57] ABSTRACT

In an air cushion landing system (ACLS) having a pair of wing pod-mounted inflatable trunks, a spool-driven lanyard system is connected to strategic points on the pod-mounted trunk surfaces for retracting and shaping the trunks for storage within the pod.

14 Claims, 5 Drawing Figures

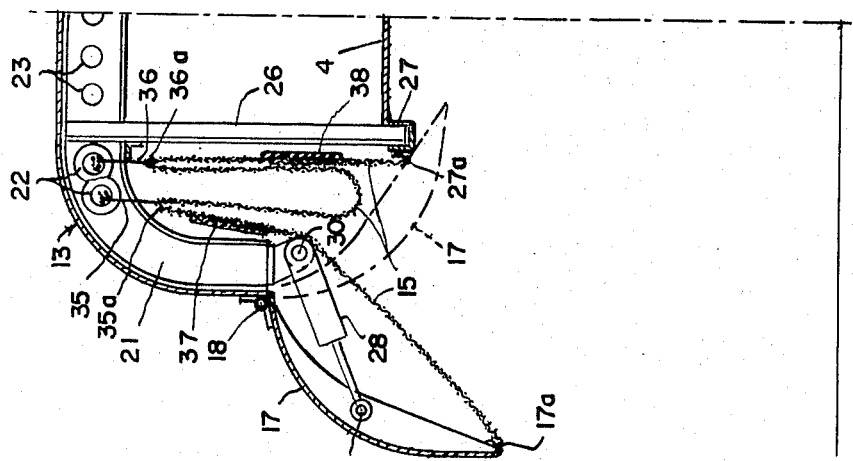
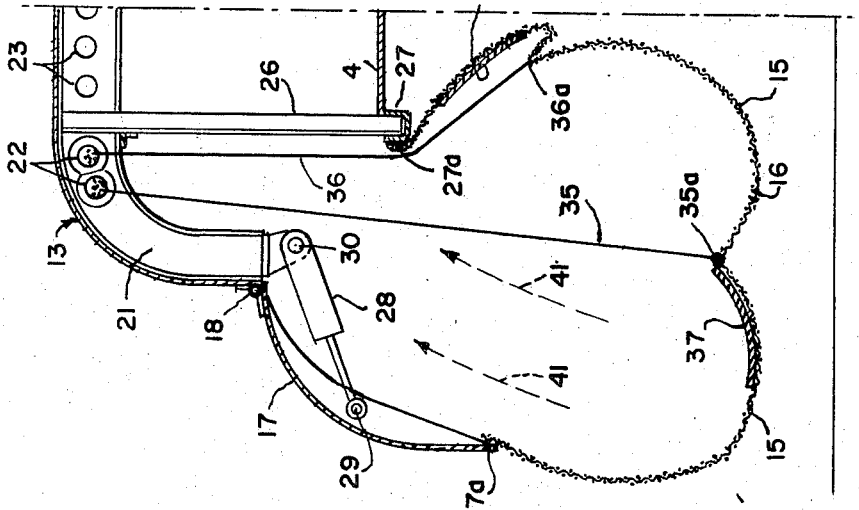
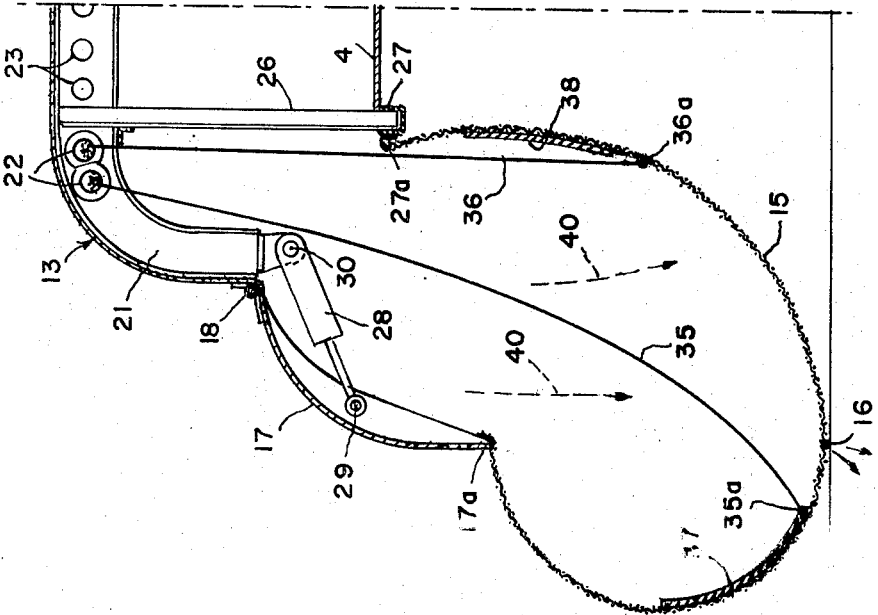

RETRACTION SYSTEM FOR DOUBLE POD AIR CUSHION LANDING GEAR SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to the field of surface effect motor vehicles and more particularly to improved retraction and shaping apparatus for an air cushion aircraft landing system.

The ACLS concept has heretofore been employed on transport planes having fuselage-mounted inflatable trunks. This concept was applied to high performance Navy fighter aircraft, such as the McDonnel-Douglas A-4, to permit landings and takeoffs from irregular surfaces as well as from improved airfields and aircraft carrier decks. Existing ACLS technology had to be tailored however to fit the rigid space, weight and performance constraints of the existing aircraft while insuring that there be no interference with weapon attachment, access to equipment in the lower fuselage, operation of the arrest hook and catapult bridle, etc. A configuration utilizing two wing pod-mounted trunks was optimally determined to most closely meet these objectives. It was necessary that these trunks be rapidly and positively retracted during flight to minimize inflight drag and prevent interference with weapons stores. To enhance this operation air is rapidly and positively drawn out of the trunk by a pivotable fan in the pod forward section. In order to insure that the trunk fabric does not flap or buffet after it has been deflated during flight, a novel lanyard retraction system was designed to rapidly retract and fold the deflated trunk for storage in the pod. The prior art does not reveal a system for rapidly and positively retracting an air cushion trunk. A typical system found in the prior art uses a plurality of straps attached around inflatable bladders to a spring-biased roller mounted on a vehicle for retracting the deflated bladders flat against the side of the vehicle. The novel spool-driven lanyard system of the present invention is a positive and rapid retraction system and thus is more efficient than systems found in the prior art.

SUMMARY OF THE INVENTION

Accordingly, it is a general purpose and object of the present invention to provide a novel, improved, compact, lightweight, reliable, low-cost retraction system for a dual pod-mounted aircraft air-cushion landing system. It is a further object of the invention to provide an aircraft undercarriage device, including inflatable trunks, which can be deflated and retracted in an improved manner during flight to conform to the contour of the fuselage for maximum aerodynamic efficiency.

These and other objects are accomplished according to the present invention by a bladder retraction system including a plurality of cords attached at their respective one ends to the bladder at spaced intervals around the periphery thereof at a minimum of two vertically separated points at each spaced interval, guides mounted within the bladder for routing the cords to their respective attachment points and retraction apparatus including a rotatable spool having the cords wound therearound and a motor for selectively rotating the spool and assimilating the bladder into a folded and retracted position.

BRIEF DESCRIPTION OF THE DRAWINGS

FIGS. 3a, 3b and 3c are enlarged partial cross sectional views taken along line 3—3 of FIG. 2 respectively showing one half of the trunk in a fully opened position, in a partially raised position and in the final raised storage position.

DESCRIPTION OF THE PREFERRED EMBODIMENT

Figure 1:
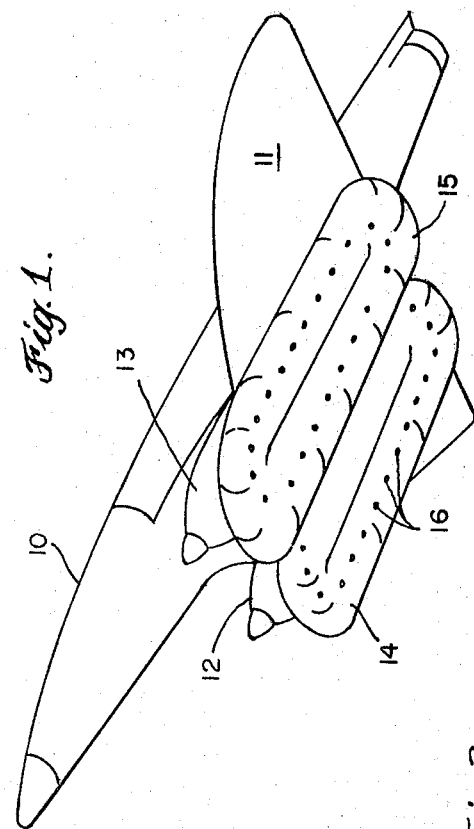
FIG. 1 is a schematic perspective view of an aircraft with dual wing pod-mounted inflated trunks.

Referring to FIG. 1, an aircraft is shown, such as a McDonnell-Douglas A-4 Navy fighter aircraft, having a fuselage 10 housing a turbojet engine (not shown), delta-shaped wings having a lower surface 11 and a pair of pods 12 and 13 depending therefrom. It is to be understood that the invention hereinafter described may be embodied in any other type or style of aircraft, ground effect machine or air cushion supported device. Depending respectively from pods 12 and 13 are a pair of toroidalshaped inflatable members or trunks 14 and 15, which may be constructed of any suitable fabric or sheet material such as neoprene-coated nylon or polyurethane dacron suitable for folding and stowing in pods 12 and 13. Trunks 14 and 15 contain a plurality of small holes 16 around their respective bottom surfaces generally defining a lifting surface area. Holes 16 allow air to escape and form a peripheral jet supporting the aircraft on a cushion of air during takeoffs and landings.

Figure 2:
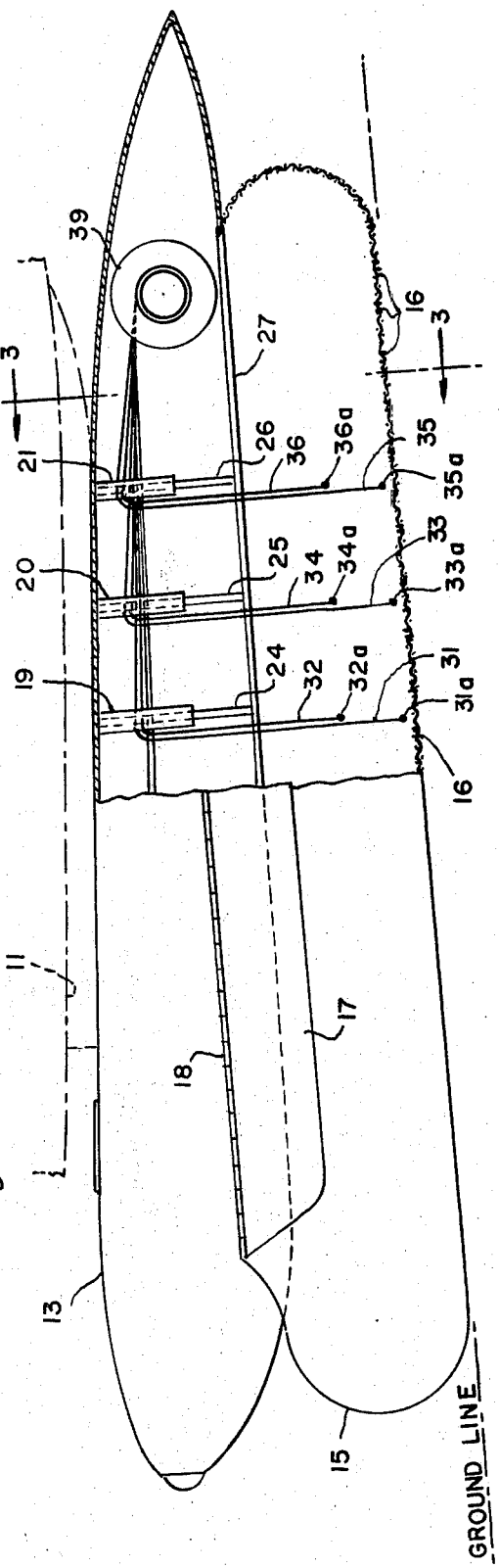
FIG. 2 is a side elevational view partially in cross section of one of the pods of FIG. 1 showing the wind-up reel and several lanyards for retracting and storing the trunk.

Referring now to FIGS. 2, 3a, 3b and 3c, pod 13, which is identical to pod 12, is shown in greater detail. Pod 13 includes a pair of doors 17 (one door shown) connected thereto by a pair of elongated hinges 18 (one hinge shown), the doors being configured to open in a downward direction to allow deployment of trunk 15 from a deflated storage position within pod 13, and close upon subsequent retraction of trunk 15 during flight to form a smooth, aerodynamically efficient pod undersurface. Pod 13 further includes a plurality of transverse ribs 19, 20 and 21 spaced at fixed intervals along the length thereof attached to the upper pod surface, as shown schematically in FIG. 2. Ribs 19, 20 and 21 are merely representative of the remainder of ribs (not shown) spaced along length of pod 13. The left half of the internal pod structure only is shown, but it should be understood that the right half (not shown) is identical. Rib 21, which is identical to ribs 19 and 20, shown in greater detail in FIGS. 3a, 3b and 3c is attached to pod 13 and includes a pair of bell-mouthed fair leads 22 located generally above trunk 15, and a plurality of lightening holes 23 across the length thereof for reducing over-all weight. Referring to FIG. 2, a plurality of hangers 24, 25 and 26 depend respectively from each of ribs 19, 20 and 21 and are attached at their respective lower ends to a longeron 27 which forms the lower contact point for door 17 when fully closed (FIG. 3c). A rigid member 4 is connected between left hand and right hand (not shown) longerons 27 to seal air in trunk 15. Hangers 24, 25 and 26 are representative of the remainder of hangers (not shown) depending from each of the remainder of ribs (not shown). A plurality of actuators, represented by 28 in FIGS. 3a–3c, which may be of a conventional hydraulic type and electromechanically controlled at a remote location, are connected at their one ends to door 17 at a pivot point 29 and at their other ends to the distal end of rib 21 at a pivot point 30. Actuator 28 is identical to a plurality of actuators each attached between the door and a respective rib for opening door 17 upon trunk deployment and closing door 17 after trunk retraction. Trunk 15 is attached at one side thereof in some convenient manner to distal end 17a of door 17 and at the other side thereof to an exterior surface 27a of longeron 27. A plurality of pairs of lanyards 31 and 32, 33 and 34, and 35 and 36, extend along the length of pod 13 through fairleads 22 in ribs 19, 20 and 21. In each pair one lanyard is connected to a lower point on the interior surface of trunk 15, such as at 31a, 33a and 35a, and the other lanyard to a higher point on trunk 15, such as at 32a, 34a and 36a. The lanyards may be constructed of any suitable material such as nylon cord with a tensile strength capable of supporting the weight of trunk 15. Elasticized cords or bungee 37 and 38 are suitably attached, such as by sewing, to the interior surfaces of trunk 15 adjacent each of the lanyard attachment points such as at 35a and 36a. Lanyards 35 and 36 retract and shape trunk 15 for storage in pod 13, and cords 37 and 38 provide additional shaping and folding capability as well as aiding in trunk retraction. All of the lanyards are attached at their respective other ends around a retraction reel or spool 39 mounted at the rear of pod 13. Attached to reel 39 is a conventional motor (not shown), which may be of any type suitable to drive reel 39 for retracting the lanyards.

Operation of the system will now be described with reference to FIGS. 2, 3a, 3b and 3c. FIGS. 2 and 3a shown the system with trunk 15 fully inflated, such as immediately following takeoff. The forward portion of pod 13 contains an air intake and evacuation system including a pivoted turbine driven fan (not shown) for positively supplying air to trunk 15, creating an air cushion by virtue of air escaping through holes 16, and for rapidly and positively evacuating the air from trunk 15 prior to retraction thereof. Although any system for rapidly inflating and evacuating the trunk will operate satisfactorily in conjunction with the present invention, a preferred system is fully described in our copending patent application entitled "Inflation and Evacuation System for an Air Cushion Landing System."

In FIG. 3a trunk 15 is fully inflated with door 17 open and lanyards 35 and 36 fully extended, attached respectively to points 35a and 36a. Arrows 40 indicate the inflow of air into trunk 15 from the inflation system (not shown). Cords 37 and 38 are fully extended and stretched, providing a contracting force on the surface of trunk 15 adjacent attachment points 35a and 36a. In FIG. 3b retraction of trunk 15 has been initiated. Air is being positively evacuated from trunk 15 by the pivoted fan (not shown) as indicated by arrows 41. Simultaneously, reel 39, driven by a motor (not shown) controlled remotely such as from the aircraft cockpit, begins to rapidly and simultaneously retract all of the lanyards, as represented by 35 and 36, causing trunk 15 to fold and retract aided by cords 37 and 38. Lanyards 35 and 36 are guided through fairleads 22 in ribs 19, 20 and 21 in order to produce smooth motion during retraction. Door 17 remains fully open during retraction. In FIG. 3c trunk 15 is fully evacuated, retracted and folded within pod 13. Upon complete retraction the evacuation system (not shown) is turned off and actuator 38 is energized rotating door 17 to a closed position as shown in phantom, producing a smooth pod surface for continued flight.

Some of the many advantages of the present invention should now be readily apparent. The novel preferred embodiment system affords a relatively simple and thus reliable apparatus for rapidly and positively retracting and folding an air cushion trunk for storage during flight. In addition the apparatus is lightweight, compact and inexpensive, as well as easy to maintain due to its lack of complexity.

Obviously, many modifications and variations of the present invention are possible in light of the above teachings. It is therefore to be understood that within the scope of the appended claims the invention may be practiced otherwise than as specifically described.

What is claimed is:

1. A retraction system comprising:
   rigid container means having an opening therein;
   an inflatable member sealingly attached to said container means at said opening to form an enclosure;
   a plurality of cords entirely within said enclosure and operatively connected at their respective one ends to the inner surface of said member at spaced intervals; and
   retraction means operatively mounted within said container means and operatively connected to the respective other ends of said cords for reeling in said cords and thereby retracting said member into said container means when said member is deflated.

2. A system as set forth in claim 1 further comprising:
   said member being formed in the shape of a toroid; and
   said cords being attached to said member at a minimum of two vertically displaced points at each spaced interval.

3. A system as set forth in claim 2 further comprising:
   said retraction means including a rotatable spool having said cords wound therearound and motor means for selectively rotating said spool.

4. A system as set forth in claim 3 further comprising:
   said container means including a torpedo-like, hollow structure formed to house the member in an evacuated state and having a plurality of ribs therein transverse to the longitudinal axis thereof at each spaced interval of cord connection to said member, each of said ribs having a strut depending therefrom, and a longeron connected to the distal ends of said struts.

5. A system as set forth in claim 4 further comprising:
   guide means operatively mounted within said container means including at least a pair of openings in each of said ribs for routing said cords therethrough to said member.

6. A system as set forth in claim 5 further comprising:
   said cover means including an outwardly-opening door having two elongated sides, one of said sides being hinged along the length of said container means structure adjacent said opening and having a plurality of actuator means pivotally connected at their respective one ends to each of said ribs and at their respective other ends to said door at spaced intervals along the length thereof for rotating said door from an open to a closed position, said door forming a smooth, continuous surface with said container means structure in the closed position.

7. A system as set forth in claim 6 further comprising:
said member being operatively attached at one side thereof to said door along one of said elongated sides, and at the other side thereof along the length of said longeron, and having elastic means operatively attached therein adjacent each point of cord connection for shaping said member during retraction thereof.

8. An air-cushion system for a vehicle, comprising:
rigid container means affixed beneath the vehicle including an opening; an inflatable member having a plurality of holes therethrough adjacent a supporting surface for providing an air cushion therebetween sealingly attached to said container means at said opening to form an enclosure;

a plurality of cords entirely within said enclosure and operatively connected at their respective one ends to the inner surface of said member of spaced intervals; and retraction means operatively mounted within said container means and operatively connected to the respective other ends of said cords for reeling in said cords and thereby retracting said member into said container means when said member is deflated.

9. A system as set forth in claim 8 further comprising:
the member being formed in the shape of a toroid; and
said cords being attached to said member at a minimum of two vertically displaced points at each spaced interval.

10. A system as set forth in claim 9 further comprising:
said retraction means including a rotatable spool having said cords wound therearound and motor means for selectively rotating said spool.

11. A system as set forth in claim 10 further comprising:
said container means including a torpedo-like, hollow structure formed to house the member in an evacuated state and having a plurality of ribs therein transverse to the longitudinal axis thereof at each spaced interval of cord connection to said member, each of said ribs having a strut depending therefrom, and a longeron connected to the distal ends of said struts.

12. A system as set forth in claim 11 further comprising:
guide means operatively mounted within said container means including at least a pair of openings in each of said ribs for routing said cords therethrough to said member.

13. A system as set forth in claim 12 further comprising:
said cover means including an outwardly-opening door having two elongated sides, one of said sides being hinged along the length of said container means structure adjacent said opening and having a plurality of actuator means pivotally connected at their respective one ends to each of said ribs and at their respective other ends to said door at spaced intervals along the length thereof for rotating said door from an open to a closed position, said door forming a smooth, continuous surface with said container means structure in the closed position.

14. A system as set forth in claim 13 further comprising:
said member being operatively attached at one side thereof to said door along one of said elongated sides, and at the other side thereof along the length of said longeron, and having elastic means operatively attached therein adjacent each point of cord connection for shaping said member during retraction thereof.

* * * * *